United States Patent [19]
Ohba

[11] Patent Number: 6,069,318
[45] Date of Patent: May 30, 2000

[54] FORMED WIRE FOR ACTUATOR

[75] Inventor: Koichiro Ohba, Kawasaki, Japan

[73] Assignee: Fujitsu Limited, Kawasaki, Japan

[21] Appl. No.: 09/133,770

[22] Filed: Aug. 12, 1998

[30] Foreign Application Priority Data

Mar. 20, 1998 [JP] Japan ................................. 10-072771

[51] Int. Cl.⁷ .................................................. H01B 7/04
[52] U.S. Cl. .................. 174/68.1; 174/70 R; 174/71 R; 174/72 A; 174/72 R
[58] Field of Search ................................ 174/68.1, 70 R, 174/71 R, 72 R, 72 A, 50.6, 110 PM, 152 A, 153 A, 135; 360/106, 104

[56] References Cited

U.S. PATENT DOCUMENTS

| | | | |
|---|---|---|---|
| 5,012,368 | 4/1991 | Bosier et al. | 360/104 |
| 5,055,969 | 10/1991 | Putnam | 361/398 |
| 5,103,359 | 4/1992 | Marazzo | 360/104 |
| 5,121,273 | 6/1992 | Slezak | 360/104 |
| 5,495,377 | 2/1996 | Kim | 360/106 |
| 5,499,161 | 3/1996 | Hosseinzadeh et al. | 361/749 |
| 5,754,370 | 5/1998 | Tsuchiya et al. | 360/104 |
| 5,808,836 | 9/1998 | Frater et al. | 360/104 |

*Primary Examiner*—Kristine Kincaid
*Assistant Examiner*—W. David Walkenhorst
*Attorney, Agent, or Firm*—Greer, Burns & Crain, Ltd.

[57] ABSTRACT

A formed wire for an actuator including a frame having a first opening formed at one end portion, a second opening formed at another end portion, a slit formed between the first opening and the second opening, and a plurality of positioning holes. A wire bundle formed by twisting a plurality of wires is inserted through the slit and thereby held by the frame. The wire bundle has a first end portion exposed to the first opening and a second end portion exposed to the second opening. The wires at the first end portion are separated from each other and bonded by adhesion to a first frame edge defining the first opening, and the wires at the second end portion are separated from each other and bonded by adhesion to a second frame edge defining the second opening.

16 Claims, 13 Drawing Sheets

F I G. 1 3
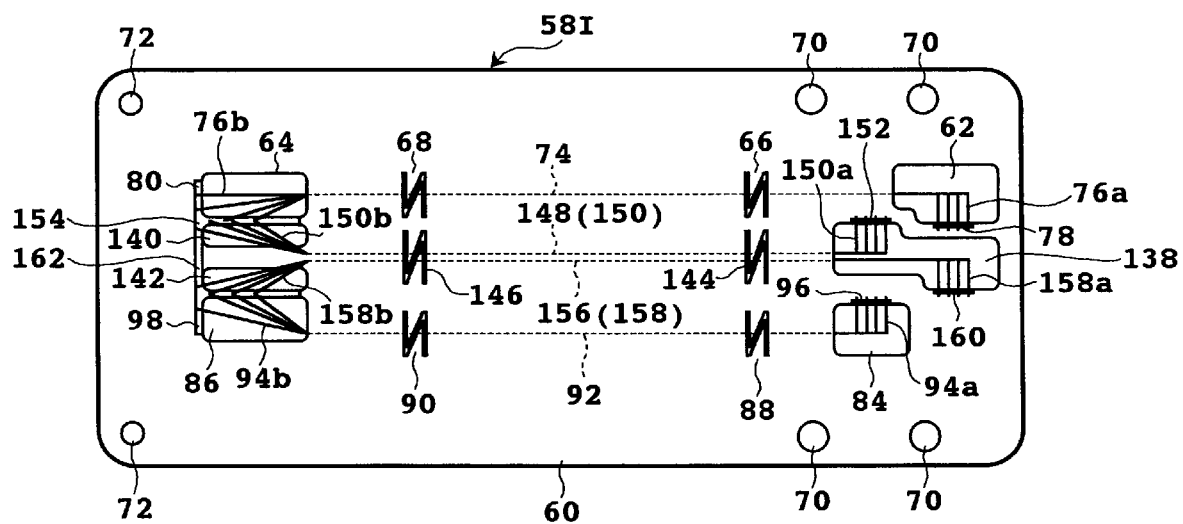

FORMED WIRE FOR ACTUATOR

BACKGROUND OF THE INVENTION

1. Field of the Invention

The present invention relates to a formed wire for an actuator used in a magnetic disk drive.

2. Description of the Related Art

In recent years, a magnetic disk drive having a high storage capacity of 2 GB or more has become dominant, and in particular a magnetic disk drive having a storage capacity of 1 GB or more per disk and adopting a magnetoresistive head (MR head) as a magnetic head is commercially available in response to the needs for cost reduction and size reduction. In the MR head, a constant sense current is supplied to a magnetoresistive element (MR element) to convert changes in magnitude of a signal field leaking from a recording track of a recording medium into changes in resistance, thereby reproducing information recorded on the recording medium as changes in voltage.

The MR head is mounted on a head slider, and the MR element of the MR head is formed generally by a thin-film process or the like. The MR head further has a coil for writing data to the recording medium. The head slider is mounted by adhesion or the like on a front end portion of a suspension formed of stainless steel. Lead lines for connecting the MR element and the coil to a recording and reproducing circuit in a magnetic disk drive are formed by copper patterns printed on the suspension. A head assembly formed by mounting the head slider on the suspension is mounted on a front end portion of an actuator arm.

A plurality of terminals formed on the head assembly and a plurality of terminals formed on a read/write flexible printed circuit board (read/write FPC) are connected by a twisted wire bundle formed by twisting a plurality of wires. The twisted wire bundle is bonded by adhesion to one side surface of the actuator arm. In bonding the twisted wire bundle to the side surface of the actuator arm, a formed wire prepared by mounting the twisted wire bundle on a polyethylene terephthalate frame (PET frame) is used.

In a conventional formed wire, the plural wires at one end portion of the twisted wire bundle to be connected to the terminals of the head assembly are preliminarily separated from each other and positioned with the spacings of the terminals, so that the plural wires are respectively connected to the terminals of the head assembly at one time by thermal compression bonding. On the other hand, the plural wires at the other end portion of the twisted wire bundle to be connected to the terminals of the read/write FPC remain twisted, so that the twisted wires must be manually untwisted and separate from each other and each separate wire must be set on the corresponding terminal (pad) of the read/write FPC before soldering.

In such a conventional method, wire bonding on the head assembly side is simple because the wires to be connected to the terminals of the head assembly are preliminarily separated and positioned. However, wire bonding on the read/write FPC is troublesome because the following working steps must be carried out.

(1) Separation of the twisted wire bundle from the PET frame (2) Untwisting of the wires of the twisted wire bundle (3) Confirmation of positions of the separated wires to the respective terminals and soldering of each separate wire to the corresponding terminal (4) Adhesive bonding of the twisted wire bundle at its intermediate portion to the actuator arm Thus, the bonding connection between the wires and the terminals of the read/write FPC is complicated, causing the occurrence of misconnection by an operator. Further, the twisted wire bundle mounted on the PET frame in the conventional formed wire is used for one head, that is, used commonly for an up head and a down head.

SUMMARY OF THE INVENTION

It is therefore an object of the present invention to provide a formed wire which can perform bonding connection of a plurality of wires to both the head assembly and the read/write FPC at a time.

In accordance with an aspect of the present invention, there is provided a formed wire for an actuator, comprising a frame having a first opening formed at one end portion, a second opening formed at another end portion, a first slit formed between said first opening and said second opening, and a plurality of positioning holes; and a first wire bundle having a first end portion, a second end portion, and an intermediate portion between said first end portion and said second end portion, said intermediate portion including a plurality of twisted wires inserted through said first slit and held by said frame, said first end portion including a plurality of separate wires exposed to said first opening and bonded by adhesion to a first frame edge defining said first opening, said second end portion including a plurality of separate wires exposed to said second opening and bonded by adhesion to a second frame edge defining said second opening.

Preferably, the frame is formed from an antistatic transparent film, e.g., a polyethylene terephthalate (PET) film. In addition to the first wire bundle, a plurality of wire bundles may be mounted on the frame. In this case, a plurality of openings are additionally formed at each of the one end portion and the other end portion of the frame according to the number of the plural wire bundles. Each wire bundle is composed of a plurality of twisted wires, and an intermediate portion thereof is inserted through a slit additionally formed in the frame. The wires at each end portion are untwisted to be separated from each other at the corresponding opening and bonded by adhesion to a frame edge defining the corresponding opening.

In accordance with another aspect of the present invention, there is provided a formed wire for an actuator, comprising a frame having a first opening formed at one end portion, a second opening formed at another end portion, a first slit formed between said first opening and said second opening, and a plurality of positioning holes; a first tube inserted through said first slit and held by said frame; and a first wire bundle having a first end portion, a second end portion, and an intermediate portion between said first end portion and said second end portion, said intermediate portion including a plurality of untwisted wires inserted in said first tube, said first end portion including a plurality of separate wires exposed to said first opening and bonded by adhesion to a first frame edge defining said first opening, said second end portion including a plurality of separate wires exposed to said second opening and bonded by adhesion to a second frame edge defining said second opening.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 13 is a view showing a ninth preferred embodiment of the present invention.

DETAILED DESCRIPTION OF THE PREFERRED EMBODIMENTS

Figure 1:
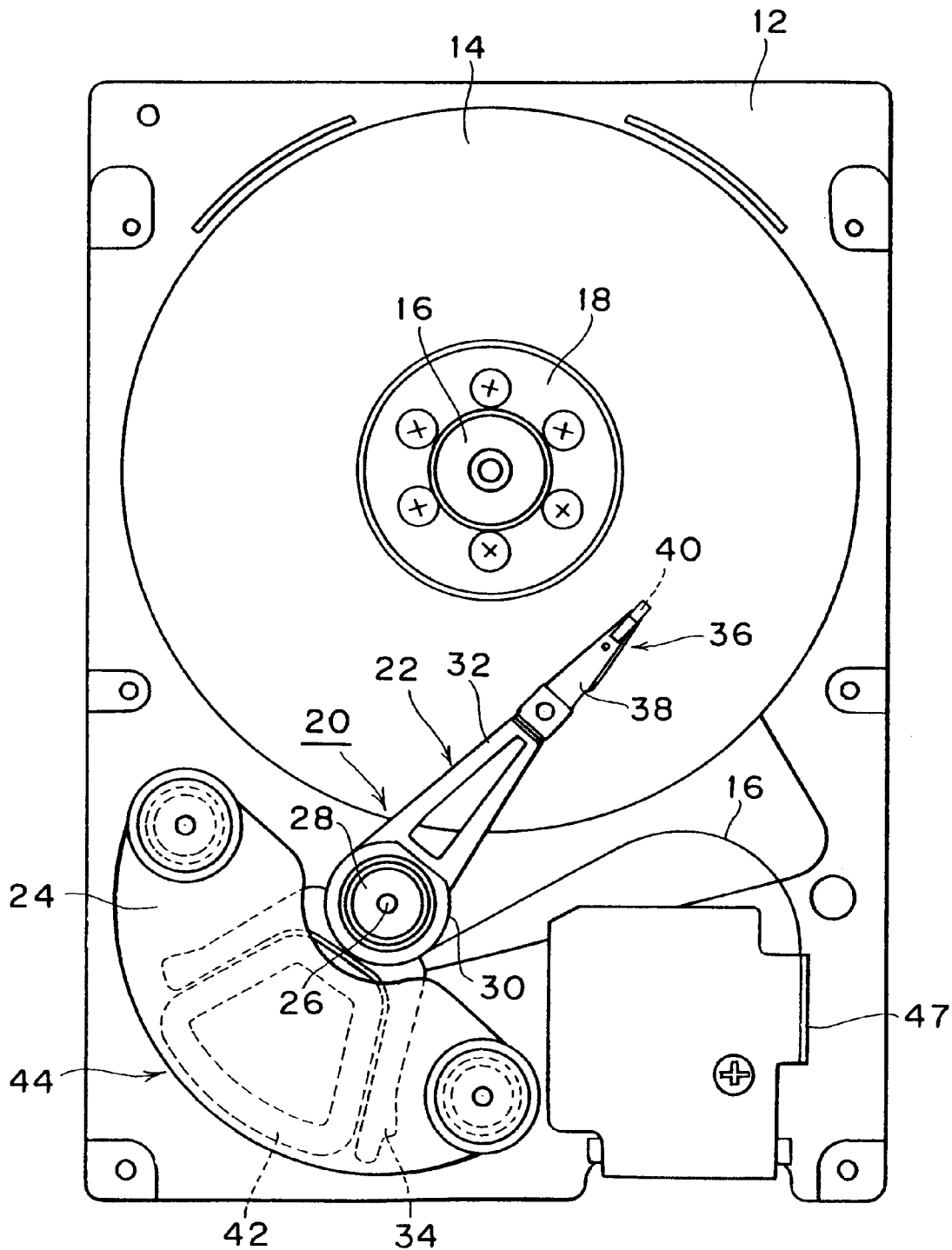
FIG. 1 is a schematic plan view of a magnetic disk drive.

Various preferred embodiments of the present invention will now be described in detail with reference to the drawings. In the following description of the preferred embodiments, substantially the same parts will be denoted by the same reference numerals.

Referring to FIG. 1, there is shown a schematic plan view of a magnetic disk drive to which the present invention is applicable. A spindle hub (not shown) rotatably driven by a motor 16 is provided on a base 12. A plurality of magnetic disks 14 and spacers (not shown) are mounted on the spindle hub in such a manner as to be alternately stacked. That is, the plural magnetic disks 14 are fixedly mounted on the spindle hub by securing a disk clamp 18 to the spindle hub by screws, and are equally spaced a given distance by the spacers.

Figure 2:
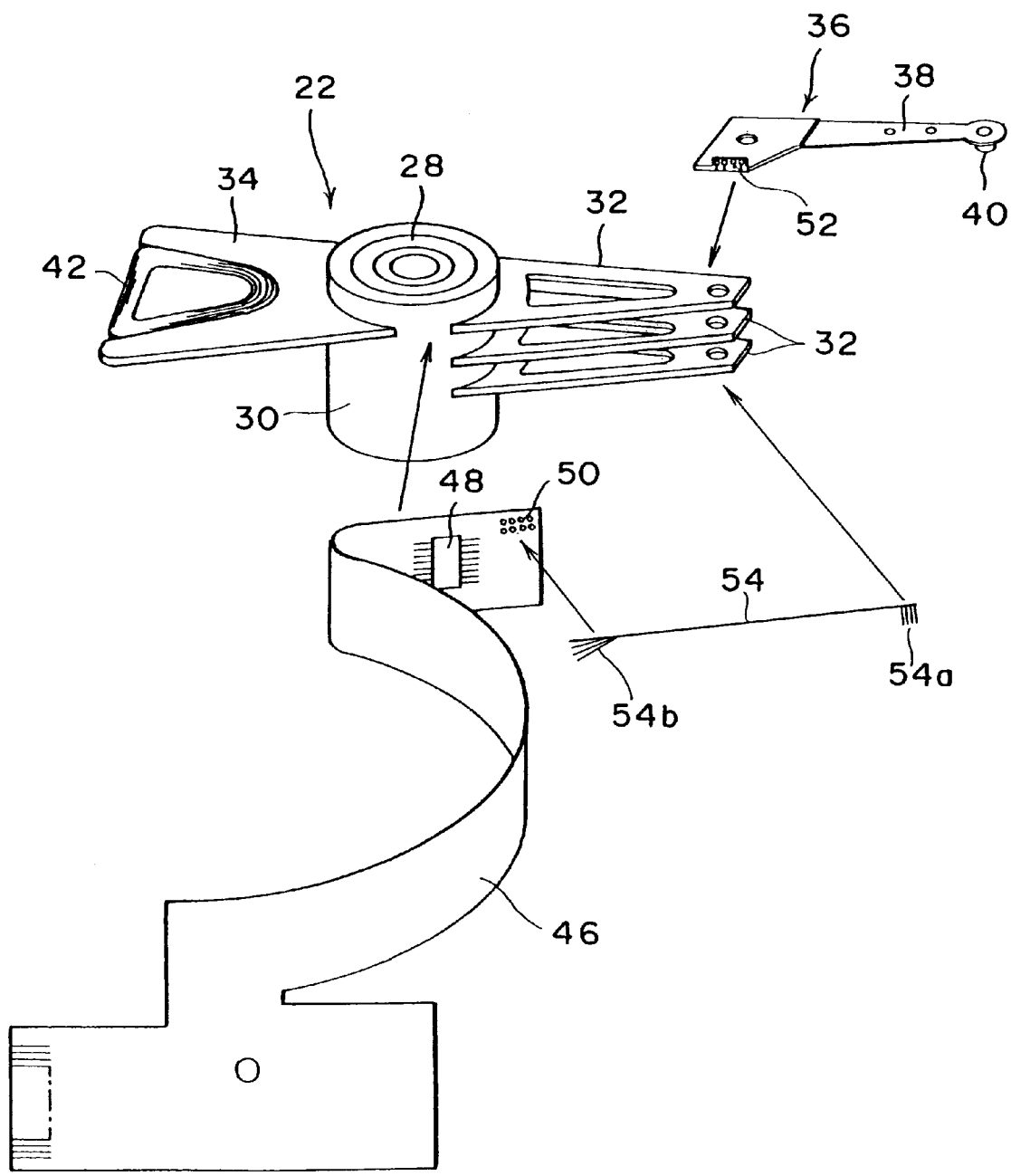
FIG. 2 is an exploded perspective view of an actuator assembly.

Reference numeral 20 denotes a rotary actuator consisting of an actuator assembly 22 and a magnetic circuit 24. The actuator assembly 22 is rotatably mounted on a shaft 26 fixed to the base 12. As best shown in FIG. 2, the actuator assembly 22 includes an actuator block 30 rotatably mounted on the shaft 26 through a bearing 28, a plurality of actuator arms 32 integral with the actuator block 30 and extending radially therefrom in one direction, and a coil supporting member 34 integral with the actuator block 30 and extending radially therefrom in a direction opposite to the direction of extension of the actuator arms 32.

A suspension 38 is fixed at its base end portion to a front end portion of each actuator arm 32, and a head slider 40 is mounted on a front end portion of the suspension 38. The suspension 38 and the head slider 40 constitute a head assembly 36. The head slider 40 is integrally formed with a magnetoresistive effect head (MR head) having a coil for data writing and a magnetoresistive effect element (MR element) for data reading. The suspension 38 is a cable printed suspension (CAPS), and it is integrally formed with copper patterns connected to terminals of the MR head.

A coil 42 is supported by the coil supporting member 34. The magnetic circuit 24 and the coil 42 inserted in a gap of the magnetic circuit 24 constitute a voice coil motor (VCM) 44. Reference numeral 46 denotes a read/write flexible printed circuit board (read/write FPC) for taking a read signal from the MR head mounted on the head slider 40 and supplying a write signal to the MR head. The read/write FPC 46 is fixed at its one end portion to the side surface of the actuator block 30. As shown in FIG. 1, the other end portion of the read/write FPC 46 is fixed to the base 12 by a fixing member 47 and electrically connected to a connector (not shown).

As shown in FIG. 2, the read/write FPC 46 has a read/write amplifier 48, passive electronic components (not shown), etc. The read/write FPC 46 further has a plurality of terminals (conductive pads) 50. Reference numeral 52 denotes terminals connected to the copper patterns formed on the suspension 38. A twisted wire bundle 54 is provided to interconnect the terminals 52 of the head assembly 36 and the terminals 50 of the read/write FPC 46. That is, the twisted wire bundle 54 is composed of four twisted wires, and has opposite end portions 54a and 54b at which the wires are untwisted and separated from each other. The separate wires at the opposite end portions 54a and 54b of the wire bundle 54 are connected by bonding at a time to the terminals 52 of the head assembly 36 and the terminals 50 of the read/write FPC 46, respectively. After this bonding connection, an intermediate portion of the twisted wire bundle 54 is bonded by adhesion to one side surface of the actuator arm 32.

Figure 3:
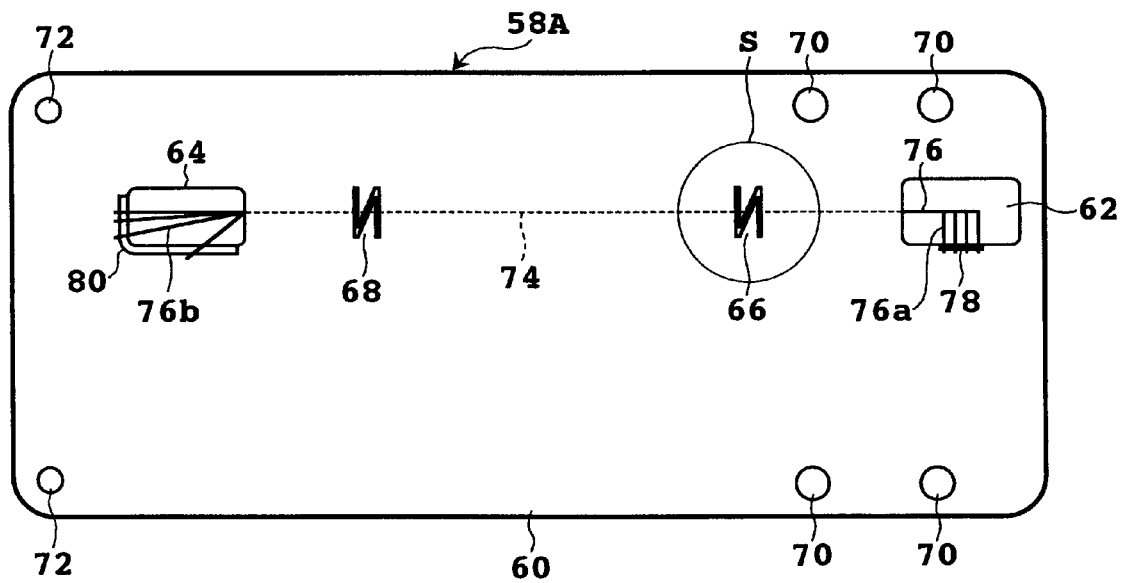
FIG. 3 is a view showing a first preferred embodiment of the present invention.

Referring to FIG. 3, there is shown a formed wire 58A according to a first preferred embodiment of the present invention. This preferred embodiment is a preferred embodiment in the case of using a twisted wire bundle for only one down head. Reference numeral 60 denotes a substantially rectangular frame formed of polyethylene terephthalate (PET), for example. The frame 60 has one end portion formed with a substantially rectangular opening 62 and another end portion formed with a substantially rectangular opening 64.

Two substantially H-shaped slits 66 and 68 are formed between the openings 62 and 64. The material of the frame 60 is not limited to PET, but any other antistatic transparent materials may be adopted. Four positioning holes 70 are formed at the one end portion of the frame 60, and two positioning holes 72 are formed at the other end portion of the frame 60. The four positioning holes 70 are used in positioning the formed wire 58A to the actuator assembly 22, and the two positioning holes 72 are used in manufacturing the formed wire 58A.

Figure 4:
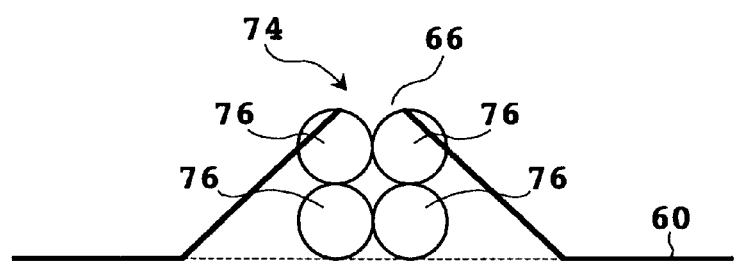
FIG. 4 is an enlarged view of an encircled part S in FIG. 3.

Reference numeral 74 denotes a wire bundle obtained by twisting four wires 76. As shown in FIG. 4 which is an enlarged view of an encircled part S in FIG. 3, the wire bundle 74 is inserted through the slit 66 and held by the frame 60. Although not shown in FIG. 4, the wire bundle 74 is also inserted through the slit 68 and held by the frame 60. The wire bundle 74 is held on the back surface of the frame 60. The wire bundle 74 has a first end portion 76a exposed to the opening 62 and a second end portion 76b exposed to the opening 64. At the first end portion 76a, the wires 76 are untwisted to be separated from each other and bonded by adhesion to a lower frame edge 78 defining a lower side of the opening 62. Similarly, at the second end portion 76b, the wires 76 are untwisted to be separated from each other and bonded by adhesion to a lower frame edge 80 defining a lower side of the opening 64.

A process for mounting the wire bundle 74 to the actuator assembly 22 by using the formed wire 58A will now be described. The formed wire 58A in this preferred embodiment is a formed wire for a single down head as mentioned above. First, the actuator assembly 22 is set on a jig (not shown). Then, the formed wire 58A shown in FIG. 3 is set in position on the actuator assembly 22 by using the positioning holes 70 of the frame 60 defining a reference position. By this setting operation, the wire bundle 74 can be positioned in opposed relationship with the side surface of the actuator arm 32.

The separate wires 76 at the first end portion 76a exposed to the opening 62 are respectively connected by thermal compression bonding to the terminals 52 of the head assembly 36, and the separate wires 76 at the second end portion 76b exposed to the opening 64 are respectively connected by thermal compression bonding to the terminals 50 of the read/write FPC 46. After this bonding connection, the wire bundle 74 is removed from the slits 66 and 68 of the frame 60, thereby separating the wire bundle 74 from the frame 60. Then, an intermediate portion of the wire bundle 74 is bonded by adhesion to the side surface of the actuator arm 32. Finally, the frame 60 is discarded.

Figure 5:
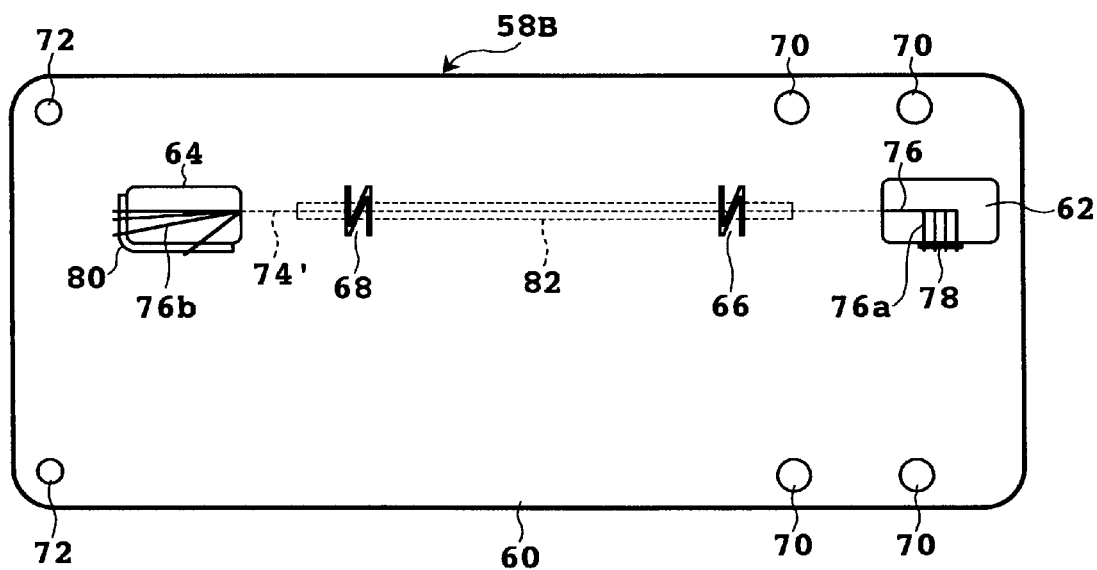
FIG. 5 is a view showing a second preferred embodiment of the present invention.

Referring to FIG. 5, there is shown a formed wire 58B according to a second preferred embodiment of the present invention. This preferred embodiment is a preferred embodiment in the case of using a tube for only one down head. In this preferred embodiment, four wires 76 forming an untwisted wire bundle 74' are not twisted and an intermediate portion of the untwisted wire bundle 74' is inserted in a tube 82 such as a vinyl tube. The tube 82 is inserted through the slits 66 and 68 and held by the frame 60. The other configuration of this preferred embodiment is similar to that of the first preferred embodiment shown in FIG. 3, so the description thereof will be omitted herein. After thermal compression bonding of the opposite end portions 76a and 76b of the untwisted wire bundle 74' to the terminals 52 and 50 of the head assembly 36 and the read/write FPC 46, the tube 82 is bonded by adhesion to the side surface of the actuator arm 32.

Figure 6:
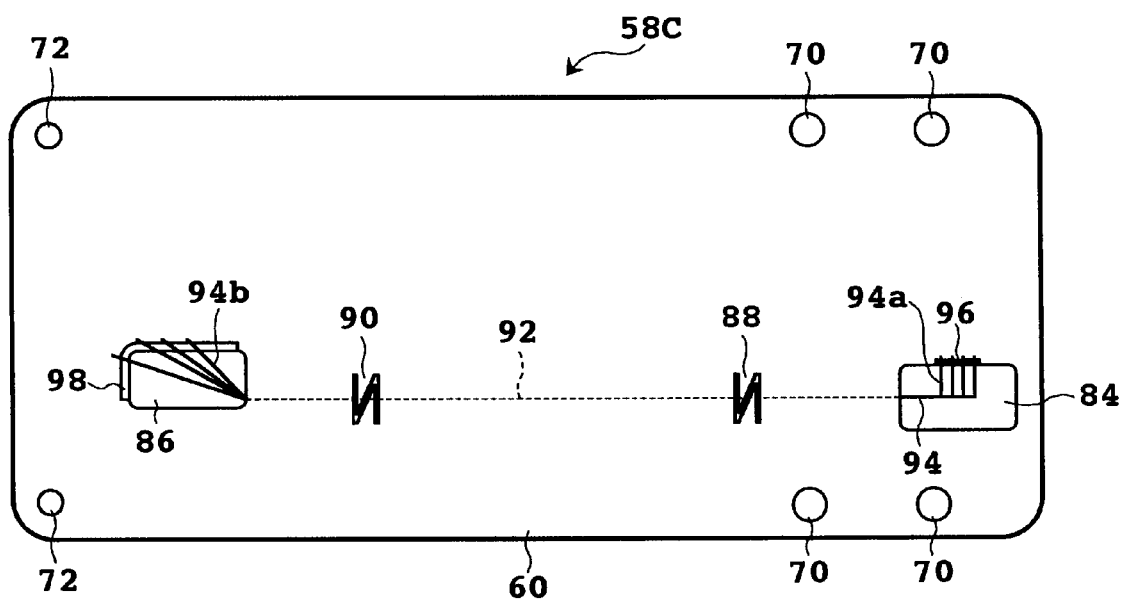
FIG. 6 is a view showing a third preferred embodiment of the present invention.

Referring to FIG. 6, there is shown a formed wire 58C according to a third preferred embodiment of the present invention. This preferred embodiment is a preferred embodiment in the case of using a twisted wire bundle for only one up head. The one end portion of the frame 60 is formed with a substantially rectangular opening 84, and the other end portion of the frame 60 is formed with a substantially rectangular opening 86. Two substantially H-shaped slits 88 and 90 are formed between the openings 84 and 86. Four wires 92 are twisted to form a twisted wire bundle 92. An intermediate portion of the twisted wire bundle 92 is inserted through the slits 88 and 90 and held by the frame 60.

The twisted wire bundle 92 has a first end portion 94a exposed to the opening 84 and a second end portion 94b exposed to the opening 86. At the first end portion 94a, the wires 94 are untwisted to be separated from each other and bonded by adhesion to an upper frame edge 96 defining an upper side of the opening 84. Similarly, the wires 94 at the second end portion 94b are untwisted to be separated from each other and bonded by adhesion to an upper frame edge 98 defining an upper side of the opening 86. A process for mounting the wire bundle 92 to the actuator assembly 22 is similar to that of the first preferred embodiment described with reference to FIG. 3, so the description thereof will be omitted herein.

Figure 7:
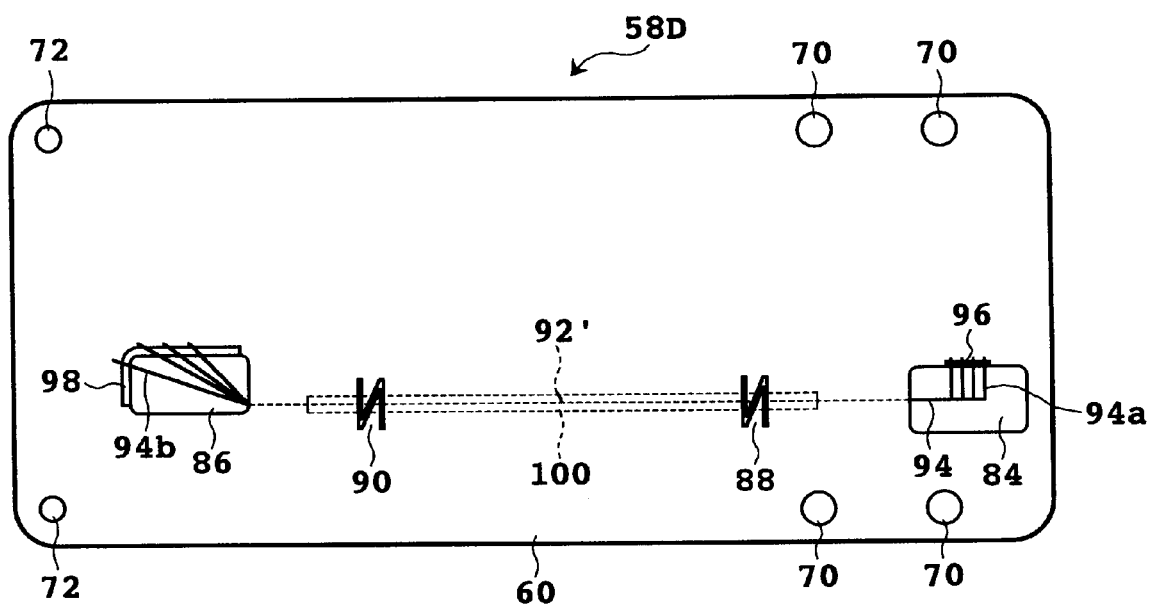
FIG. 7 is a view showing a fourth preferred embodiment of the present invention.

Referring to FIG. 7, there is shown a formed wire 58D according to a fourth preferred embodiment of the present invention. This preferred embodiment is a preferred embodiment in the case of using a tube for only one up head. In this preferred embodiment, four wires 94 forming an untwisted wire bundle 92' are not twisted and an intermediate portion of the untwisted wire bundle 92' is inserted in a tube 100. The tube 100 is inserted through the slits 88 and 90 and held by the frame 60. The other configuration of this preferred embodiment is similar to that of the third preferred embodiment shown in FIG. 6, so the description thereof will be omitted herein.

Referring to FIG. 6, there is shown a formed wire 58E according to a fifth preferred embodiment of the present invention. This preferred embodiment is a preferred embodiment in the case of using two twisted wire bundles for only two down heads. In this preferred embodiment, the one end portion of the frame 60 is formed with a substantially rectangular opening 102 in addition to the opening 62 used in the first preferred embodiment, and the other end portion of the frame 60 is formed with a substantially rectangular opening 104 in addition to the opening 64 used in the first preferred embodiment.

A twisted wire bundle 74 is mounted on the frame 60 like the first preferred embodiment shown in FIG. 3. Further, two substantially H-shaped slits 106 and 108 are formed between the openings 102 and 104. Four wires 112 are twisted to form a twisted wire bundle 110. An intermediate portion of the twisted wire bundle 110 is inserted through the slits 106 and 108 and held by the frame 60. The twisted wire bundle 110 has a first end portion 112a exposed to the opening 102 and a second end portion 112b exposed to the opening 104. The wires 112 at the first end portion 112a are untwisted to be separated from each other and bonded by adhesion to a lower frame edge 114 defining a lower side of the opening 102, and the wires 112 at the second end portion 112b are untwisted to be separated from each other and bonded by adhesion to a lower frame edge 115 defining a lower side of the opening 104. By using the formed wire 58E according to this preferred embodiment, wire bonding for two down heads can be efficiently performed.

Figure 8:
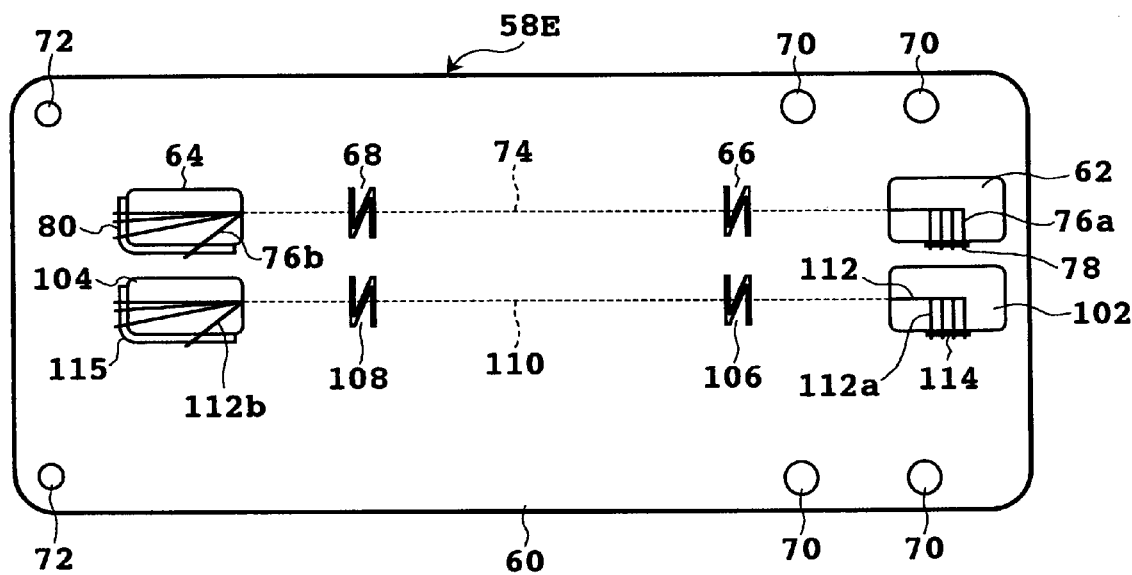
FIG. 8 is a view showing a fifth preferred embodiment of the present invention.
Figure 9:
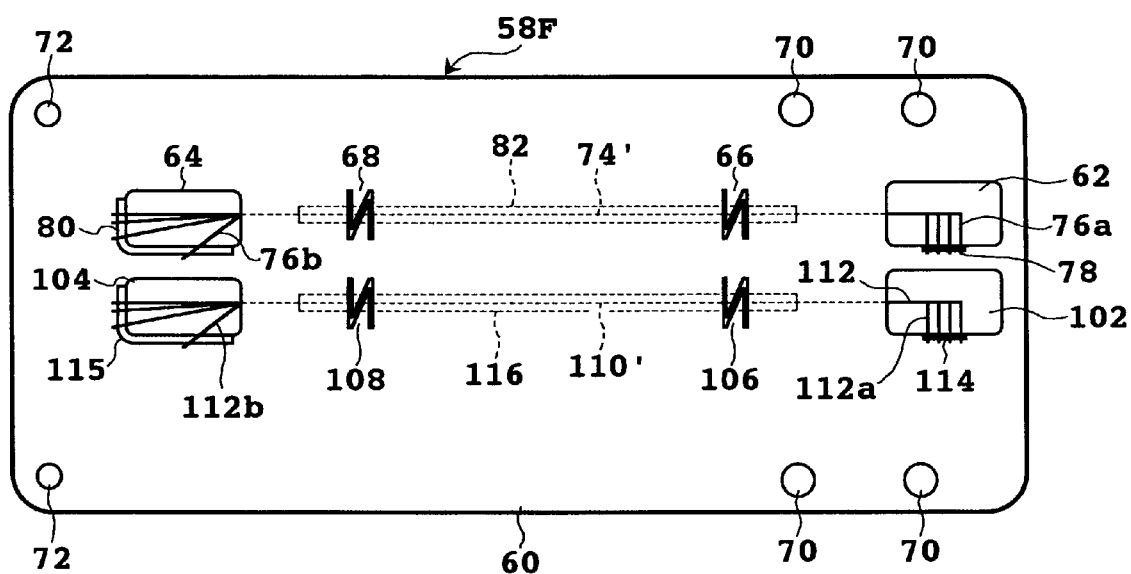
FIG. 9 is a view showing a sixth preferred embodiment of the present invention.

Referring to FIG. 9, there is shown a formed wire 58F according to a sixth preferred embodiment of the present invention. This preferred embodiment is a preferred embodiment in the case of two tubes for only two down heads. As similar to the second preferred embodiment, four wires 76 forming an untwisted wire bundle 74' are not twisted and an intermediate portion of the untwisted wire bundle 74' is inserted in a tube 82. Similarly, four wires 112 forming an untwisted wire bundle 110' are not twisted and an intermediate portion of the untwisted wire bundle 110' is inserted in a tube 116. The tube 82 is inserted through the slits 66 and 68 and held by the frame 60, and the tube 116 is inserted through the slits 106 and 108 and held by the frame 60. The other configuration of this preferred embodiment is similar to that of the fifth preferred embodiment shown in FIG. 8, so the description thereof will be omitted herein.

Figure 10:
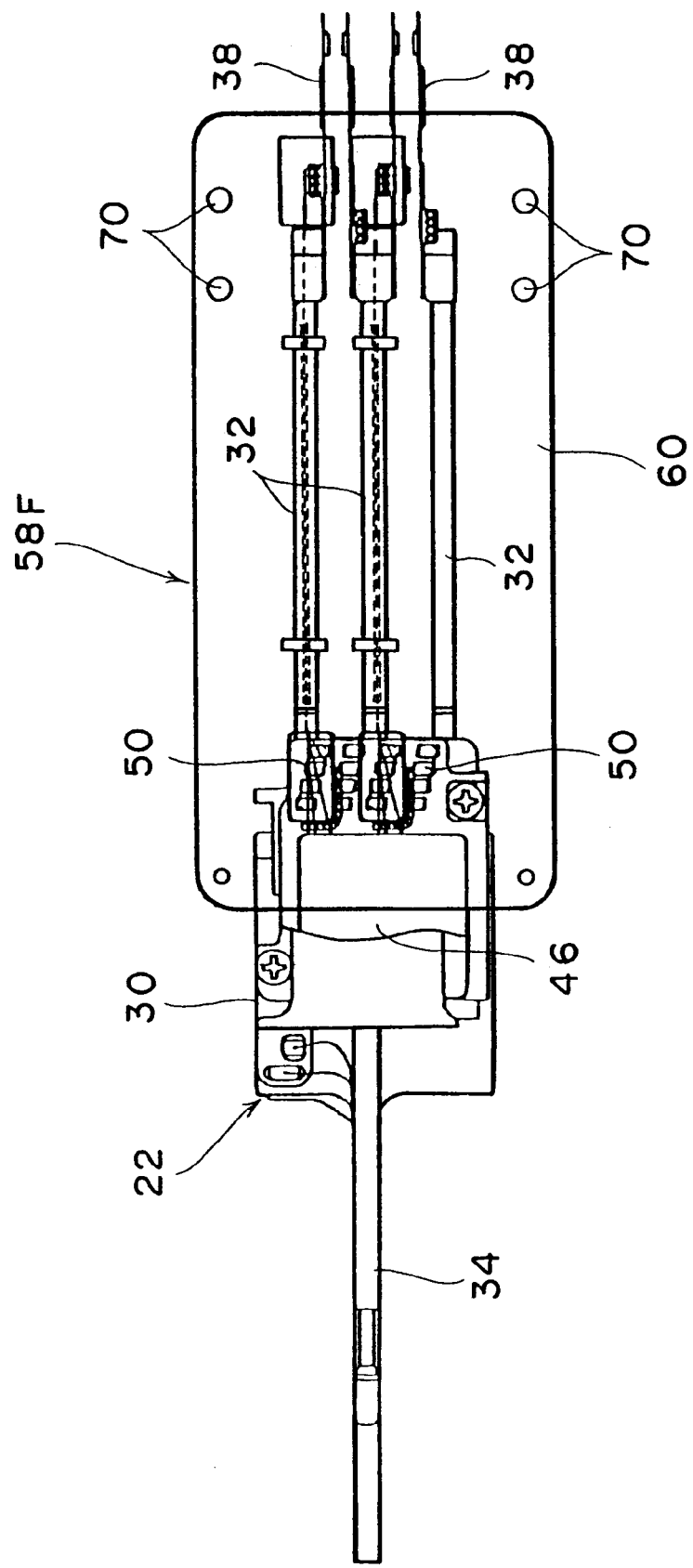
FIG. 10 is a view showing a condition where the formed wire according to the sixth preferred embodiment is set on the actuator assembly.

Referring to FIG. 10, there is shown a condition where the formed wire 58F according to the sixth preferred embodiment is set on the actuator assembly 22. As similar to the above description of the first preferred embodiment with reference to FIG. 3, the actuator assembly 22 is first set on a jig (not shown). Then, the formed wire 58F shown in FIG. 9 is set in position on the actuator assembly 22 by using the positioning holes 70. Then, the separate wires 76 and 112 at the first end portions 76a and 112a exposed to the openings 62 and 102 are connected by thermal compression bonding to the terminals 52 of the head assemblies 32.

Similarly, the separate wires 76 and 112 at the second end portions 76b and 112b exposed to the openings 64 and 104 are connected by thermal compression bonding to the terminals 50 of the read/write FPC 46. After this bonding connection, the tube 82 is removed from the slits 66 and 68, and the tube 116 is removed from the slits 106 and 108. Thereafter, the tubes 82 and 116 are bonded by adhesion to the side surfaces of the actuator arms 32 on the same side. Finally, the frame 60 is discarded.

Figure 11:
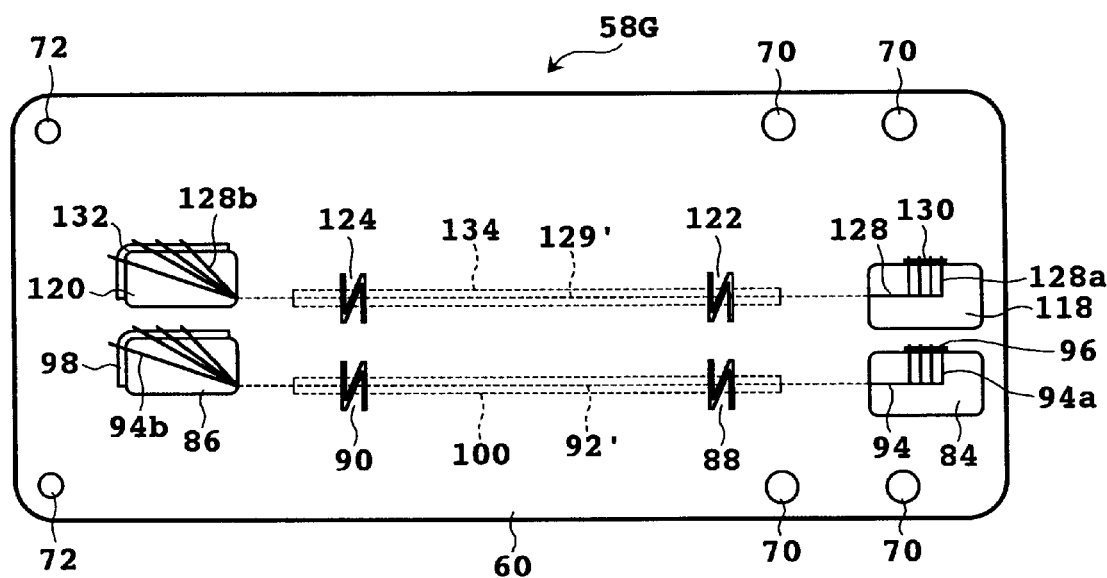
FIG. 11 is a view showing a seventh preferred embodiment of the present invention.

Referring to FIG. 11, there is shown a formed wire 58G according to a seventh preferred embodiment of the present invention. This preferred embodiment is a preferred embodiment in the case of using two tubes for only two up heads. The one end portion of the frame 60 is formed with a substantially rectangular opening 118 in addition to the opening 84 used in the fourth preferred embodiment shown in FIG. 7, and the other end portion of the frame 60 is formed with a substantially rectangular opening 120 in addition to the opening 86 used in the fourth preferred embodiment shown in FIG. 7.

Like the fourth preferred embodiment shown in FIG. 7, a tube 100 covering an untwisted wire bundle 92' of four wires 94 is inserted through the slits 88 and 90 and held by the frame 60. Similarly, an intermediate portion of an untwisted wire bundle 129' of four wires 128 is inserted in a tube 134. The tube 134 is inserted through slits 122 and 124 and held by the frame 60. The wire bundle 129' has a first end portion 128a exposed to the opening 118 and a second end portion 128b exposed to the opening 120. The wires 128 at the first end portion 128a are separated from each other and bonded by adhesion to an upper frame edge 130 defining an upper side of the opening 118, and the wires 128 at the second end portion 128b are separated from each other and bonded by adhesion to an upper frame edge 132 defining an upper side of the opening 120. As a modification of this preferred embodiment, the wires 94 and 128 may be twisted to form two twisted wire bundles rather than using the tubes 100 and 134 respectively covering the untwisted wires 94 and 128.

Figure 12:
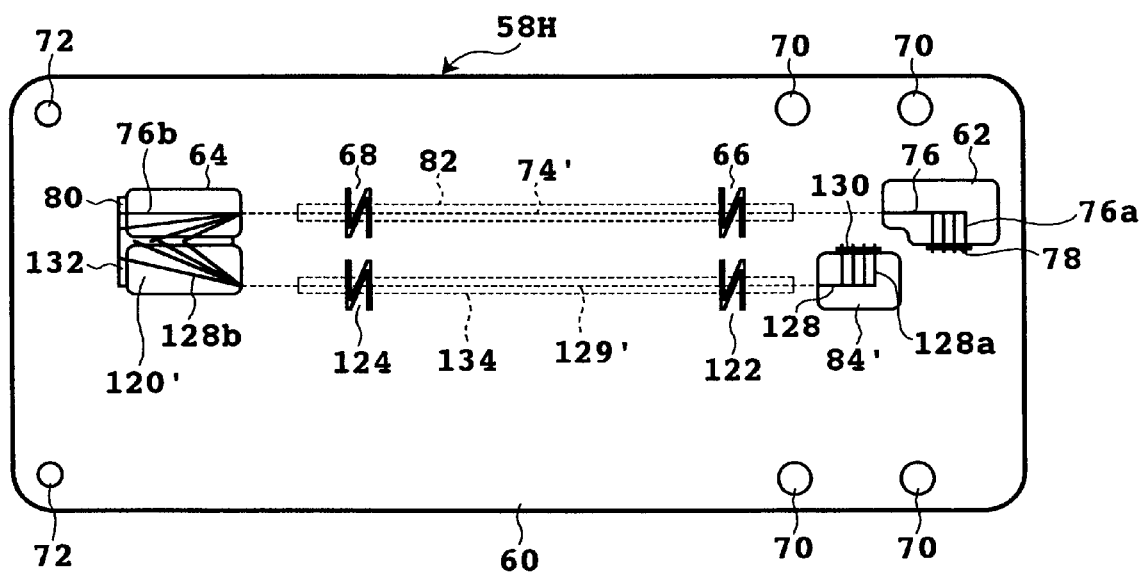
FIG. 12 is a view showing an eighth preferred embodiment of the present invention.

Referring to FIG. 12, there is shown a formed wire 58H according to an eighth preferred embodiment of the present invention. This preferred embodiment is a preferred embodiment in the case of using two tubes for one down head and one up head. The one end portion of the frame 60 is formed with a substantially rectangular opening 84' in addition to the opening 62 used in the second preferred embodiment shown in FIG. 5, and the other end portion of the frame 60 is formed with a substantially rectangular opening 120' in addition to the opening 64 used in the second preferred embodiment shown in FIG. 5.

An untwisted wire bundle 74' of four wires 76 is inserted at its intermediate portion in a tube 82, and an untwisted wire bundle 129' of four wires 128 is inserted at its intermediate portion in a tube 134. According to this preferred embodiment, wire bonding for one down head and one up head can be efficiently performed. As a modification of this preferred embodiment, the wires 76 and 128 may be twisted to form two twisted wire bundles rather than using the tubes 82 and 134 respectively covering the untwisted wires 76 and 128.

Referring to FIG. 13, there is shown a formed wire 58I according to a ninth preferred embodiment of the present invention. This preferred embodiment is a preferred embodiment in the case of using four twisted wire bundles for two down heads and two up heads. The one end portion of the frame 60 is formed with a substantially rectangular elongated opening 138 in addition to the opening 62 used in the first preferred embodiment and the opening 84 used in the third preferred embodiment, and the other end portion of the frame 60 is formed with two substantially rectangular flattened openings 140 and 142 in addition to the opening 64 used in the first preferred embodiment and the opening 86 used in the third preferred embodiment.

Two substantially H-shaped slits 144 and 146 are formed between the opening 138 and the openings 140 and 142. Four wires 150 are twisted to form a twisted wire bundle 148, and four wires 158 are twisted to form a twisted wire bundle 156. Both the twisted wire bundles 148 and 156 are inserted through the slits 144 and 146 and held by the frame 60. The twisted wire bundle 148 has a first end portion 150a exposed to the opening 138 and a second end portion 150b exposed to the opening 140. The wires 150 at the first end portion 150a are untwisted to be separated from each other and bonded by adhesion to an upper frame edge 152 defining an upper side of the opening 138, and the wires 150 at the second end portion 105b are untwisted to be separated from each other and bonded by adhesion to an upper frame edge 154 defining an upper side of the opening 140.

On the other hand, the twisted wire bundle 156 has a first end portion 158a exposed to the opening 138 and a second end portion 158b exposed to the opening 142. The wires 158 at the first end portion 158a are untwisted to be separated from each other and bonded by adhesion to a lower frame edge 160 defining a lower side of the opening 138, and the wires 158 at the second end portion 158b are untwisted to be separated from each other and bonded by adhesion to a lower frame edge 162 defining a lower side of the opening 142. By using the formed wire 58I according to this preferred embodiment, wire bonding for two down heads and two up heads can be efficiently performed.

Figure 14:
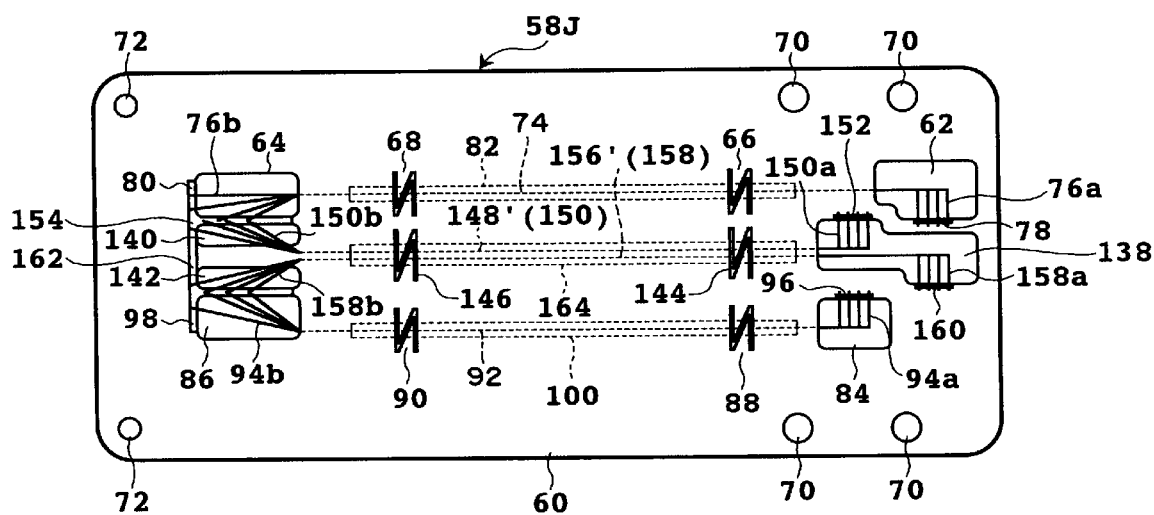
FIG. 14 is a view showing a tenth preferred embodiment of the present invention.

Referring to FIG. 14, there is shown a formed wire 58J according to a tenth preferred embodiment of the present invention. This preferred embodiment is a preferred embodiment in the case of using three tubes for two down heads and two up heads. An untwisted wire bundle 138' of four wires 150 and an untwisted wire bundle 156' of four wires 158 are inserted in a common tube 164. That is, totally eight untwisted wires are inserted in the tube 164. The tube 164 is inserted through the slits 144 and 146 and held by the frame 60. According to this preferred embodiment, wire bonding for two down heads and two up heads can be efficiently performed like the ninth preferred embodiment shown in FIG. 13.

By using the formed wire according to the present invention, wire bonding by a manual operation can be efficiently performed, and automated wire bonding is also allowed. Further, the occurrence of defectives due to misoperation can also be prevented.

What is claimed is:

1. A formed wire for an actuator, comprising:
    a frame having a first opening formed at one end portion, a second opening formed at another end portion, a first slit formed between said first opening and said second opening, and a plurality of positioning holes; and
    a first wire bundle having a first end portion, a second end portion, and an intermediate portion between said first end portion and said second end portion, said intermediate portion including a plurality of twisted wires inserted through said first slit and held by said frame, said first end portion including a plurality of separate wires exposed to said first opening and bonded by adhesion to a first frame edge defining said first opening, said second end portion including a plurality of separate wires exposed to said second opening and bonded by adhesion to a second frame edge defining said second opening.

2. A formed wire according to claim 1, wherein said frame is formed of an antistatic material.

3. A formed wire according to claim 1, wherein said frame is formed of polyethylene terephthalate.

4. A formed wire according to claim 1, wherein said first opening is substantially rectangular, and said first frame edge defines a lower side of said first opening.

5. A formed wire according to claim 1, wherein first opening is substantially rectangular, and said first frame edge defines an upper side of said first opening.

6. A formed wire according to claim 1, wherein said first wire bundle comprises four wires.

7. A formed wire according to claim 1, wherein:

said frame further has a third opening formed at said one end portion, a fourth opening formed at said other end portion, and a second slit formed between said third opening and said fourth opening;

said formed wire further comprising a second wire bundle having a third end portion, a fourth end portion, and an intermediate portion between said third end portion and said fourth end portion, said intermediate portion between said third and fourth end portions including a plurality of twisted wires inserted through said second slit and held by said frame, said third end portion including a plurality of separate wires exposed to said third opening and bonded by adhesion to a third frame edge defining said third opening, said fourth end portion including a plurality of separate wires exposed to said fourth opening and bonded by adhesion to a fourth frame edge defining said fourth opening.

8. A formed wire according to claim 7, wherein:

said frame further has a fifth opening formed at said one end portion, sixth and seventh openings formed at said other end portion, and a third slit formed between said fifth opening and said sixth and seventh openings;

said formed wire further comprising a third wire bundle having a fifth end portion, a sixth end portion, and an intermediate portion between said fifth end portion and said sixth end portion, said intermediate portion between said fifth and sixth end portions including a plurality of twisted wires inserted through said third slit and held by said frame, said fifth end portion including a plurality of separate wires exposed to said fifth opening and bonded by adhesion to a fifth frame edge defining said fifth opening, said sixth end portion including a plurality of separate wires exposed to said sixth and seventh openings and bonded by adhesion to a sixth frame edge defining said sixth and seventh openings.

9. A formed wire for an actuator, comprising:

a frame having a first opening formed at one end portion, a second opening formed at another end portion, a first slit formed between said first opening and said second opening, and a plurality of positioning holes;

a first tube inserted through said first slit and held by said frame; and a first wire bundle having a first end portion, a second end portion, and an intermediate portion between said first end portion and said second end portion, said intermediate portion including a plurality of untwisted wires inserted in said first tube, said first end portion including a plurality of separate wires exposed to said first opening and bonded by adhesion to a first frame edge defining said first opening, said second end portion including a plurality of separate wires exposed to said second opening and bonded by adhesion to a second frame edge defining said second opening.

10. A formed wire according to claim 9, wherein said frame is formed of an antistatic material.

11. A formed wire according to claim 9, wherein said frame is formed of polyethylene terephthalate.

12. A formed wire according to claim 9, wherein said first opening is substantially rectangular, and said first frame edge defines a lower side of said first opening.

13. A formed wire according to claim 9, wherein said first opening is substantially rectangular, and said first frame edge defines an upper side of said first opening.

14. A formed wire according to claim 9, wherein said first wire bundle comprises four wires.

15. A formed wire according to claim 9, wherein:

said frame further has a third opening formed at said one end portion, a fourth opening formed at said other end portion, and a second slit formed between said third opening and said fourth opening;

said formed wire further comprising:

a second tube inserted through said second slit and held by said frame; and a second wire bundle having a third end portion, a fourth end portion, and an intermediate portion between said third end portion and said fourth end portion, said intermediate portion between said third and fourth end portions including a plurality of untwisted wires inserted in said second tube, said third end portion including a plurality of separate wires exposed to said third opening and bonded by adhesion to a third frame edge defining said third opening, said fourth end portion including a plurality of separate wires exposed to said fourth opening and bonded by adhesion to a fourth frame edge defining said fourth opening.

16. A formed wire according to claim 15, wherein:

said frame further has a fifth opening formed at said one end portion, sixth and seventh openings formed at said other end portion, and a third slit formed between said fifth opening and said sixth and seventh openings;

said formed wire further comprising:

a third tube inserted in said third slit and held by said frame; and a third wire bundle having a fifth end portion, a sixth end portion, and an intermediate portion between said fifth end portion and said sixth end portion, said intermediate portion between said fifth and sixth end portions including a plurality of untwisted wires inserted in said third tube, said fifth end portion including a plurality of separate wires exposed to said fifth opening and bonded by adhesion to a fifth frame edge defining said fifth opening, said sixth end portion including a plurality of separate wires exposed to said sixth and seventh openings and bonded by adhesion to a sixth frame edge defining said sixth and seventh openings.

* * * * *

UNITED STATES PATENT AND TRADEMARK OFFICE
CERTIFICATE OF CORRECTION

PATENT NO. : 6,069,318
DATED : May 30, 2000
INVENTOR(S) : Ohba

It is certified that error appears in the above-identified patent and that said Letters Patent is hereby corrected as shown below:

Title page:
Under "[57] Abstract", in line 1, please delete "including" and insert -- includes --.

In the Specification:
Page 3, line 4, delete "separate" and insert -- separated -- therefor.
Page 18, line 14, delete "32" and insert -- 36 -- therefor.

In the Claims:
Claim 5,
Line 2, before "first" insert -- said --

Claim 7,
Line 5, after "opening;" insert -- and --
Line 6, delete "comprising" and insert -- comprises -- therefor.

Claim 8,
Line 6, after "openings;" insert -- and --
Line 7, delete "comprising" and insert -- comprises -- therefor.

Claim 15,
Line 5, after "opening;" insert -- and --
Line 6, delete "comprising:" and insert -- comprises -- therefor.

Claim 16,
Line 6, after "openings;" insert -- and --
Line 7, delete "comprising:" and insert -- comprises -- therefor.

Signed and Sealed this

Eighteenth Day of September, 2001

Attest:

*Nicholas P. Godici*

NICHOLAS P. GODICI
*Attesting Officer*　*Acting Director of the United States Patent and Trademark Office*